United States Patent
Engle et al.

(10) Patent No.: US 8,302,403 B2
(45) Date of Patent: Nov. 6, 2012

(54) COMPRESSOR-LESS MICRO GAS TURBINE POWER GENERATING SYSTEM

(75) Inventors: Darren T. Engle, Orlando, FL (US); Jody W. Wilson, Winter Springs, FL (US)

(73) Assignee: Acudyne Incorporated, Orlando, FL (US)

( * ) Notice: Subject to any disclaimer, the term of this patent is extended or adjusted under 35 U.S.C. 154(b) by 797 days.

(21) Appl. No.: 12/478,601

(22) Filed: Jun. 4, 2009

(65) Prior Publication Data
US 2009/0301091 A1 Dec. 10, 2009

Related U.S. Application Data

(60) Provisional application No. 61/060,024, filed on Jun. 9, 2008, provisional application No. 61/140,497, filed on Dec. 23, 2008.

(51) Int. Cl.
*F02C 3/00* (2006.01)
(52) U.S. Cl. ............ 60/727; 60/805; 60/39.511; 60/722
(58) Field of Classification Search ............... 60/39.511, 60/727, 805, 734, 722
See application file for complete search history.

(56) References Cited

U.S. PATENT DOCUMENTS

| | | | |
|---|---|---|---|
| 3,151,250 A * | 9/1964 | Carlson | 290/52 |
| 3,831,373 A | 8/1974 | Flynt | |
| 4,100,745 A | 7/1978 | Gyarmathy et al. | |
| 4,158,145 A | 6/1979 | Kartsounes et al. | |
| 4,237,692 A * | 12/1980 | Ahrens et al. | 60/659 |
| 4,312,179 A | 1/1982 | Zaugg | |
| 4,686,822 A | 8/1987 | Frutschi | |
| 4,815,294 A | 3/1989 | David | |
| 5,010,730 A | 4/1991 | Knuth et al. | |
| 5,097,659 A * | 3/1992 | Lampe et al. | 60/39.27 |
| 5,379,589 A | 1/1995 | Cohn et al. | |
| 5,495,709 A | 3/1996 | Frutschi | |
| 5,622,043 A | 4/1997 | Humphries, Jr. | |
| 5,924,283 A | 7/1999 | Burke, Jr. | |
| 5,927,066 A | 7/1999 | Shekleton et al. | |
| 5,934,063 A | 8/1999 | Nakhamkin | |
| 6,244,037 B1 | 6/2001 | Nakhamkin et al. | |
| 6,647,707 B2 * | 11/2003 | Dev | 60/39.43 |
| 6,745,569 B2 | 6/2004 | Gerdes | |
| 7,086,231 B2 | 8/2006 | Pinkerton | |
| 7,416,137 B2 | 8/2008 | Hagen et al. | |

OTHER PUBLICATIONS

Sears, John R., Product Marketing Manager, Active Power, "Thermal and Compressed-Air Storage (TACAS): The Next Generation of Energy Storage Technology", 6 pages.

* cited by examiner

*Primary Examiner* — Ehud Gartenberg
*Assistant Examiner* — Steven Sutherland
(74) *Attorney, Agent, or Firm* — Howard M. Gitten; Edwards Wildman Palmer LLP

(57) ABSTRACT

A compressor-less micro gas turbine has a compressed working medium container for maintaining a gas turbine under pressure. A combustion chamber is in fluid communication with the compressed gas container for receiving a gas from the gas container and heating the gas within the combustion chamber to create an expanded gas. A heater heats the combustion chamber to expand the working gas therein. A turbine in fluid communication with the combustion chamber for receiving the expanded gas. The expanded gas drives the turbine. A generator is operatively coupled to the turbine. The turbine provides a mechanical input to the generator causing the generator to produce electricity.

15 Claims, 4 Drawing Sheets

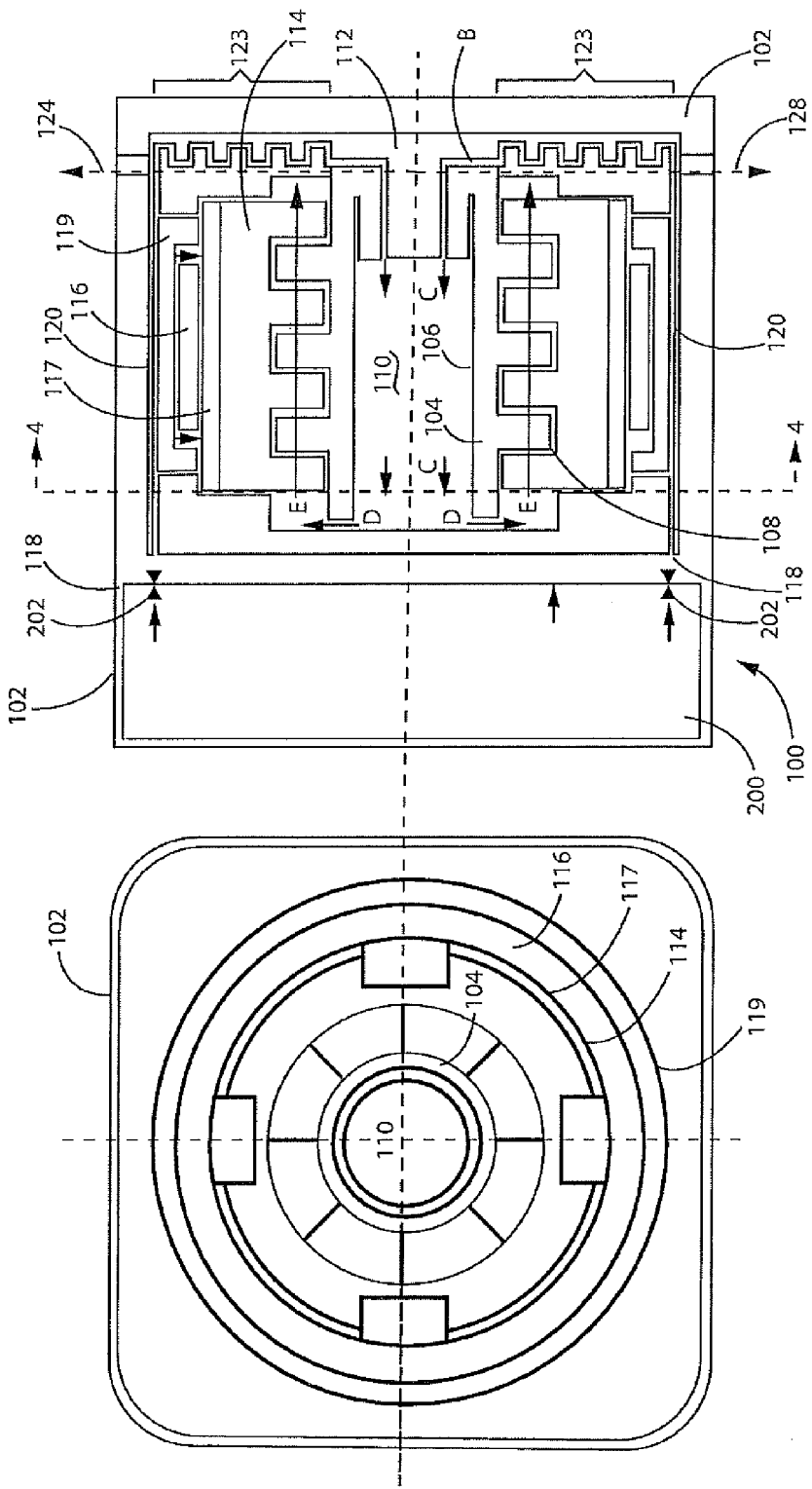

COMPRESSOR-LESS MICRO GAS TURBINE POWER GENERATING SYSTEM

CROSS-REFERENCE TO RELATED APPLICATIONS

This application claims priority to U.S. Provisional Application No. 61/060,024 filed Jun. 9, 2008; and U.S. Provisional Application No. 61/140,497 filed Dec. 23, 2008 in the entirety.

BACKGROUND OF THE INVENTION

This invention is directed to a turbine for power generation, and in particular, a miniature turbine capable of operation in a vacuum.

The current trend towards miniaturization, portability and more in general ubiquitous intelligence, has led to the development of a wide range of new portable powered products such as laptops, cellular phones, PDAs, etc. However, the power requirements of such systems have received much less attention: typically, traditional battery-operated electronic systems are used. Nevertheless, the energy density of most fueled power units are still one hundred times more than that of the best performing batteries. Such power units can be based on a wide range of operating principles, ranging from fuel cells and thermoelectric devices, to combustion engines and gas turbines.

While fuel cells are expected to offer the highest efficiency, micro gas turbines are expected to offer the highest power density. Given the need for mobile high power density, energy conversion needs to be provided in very small packages. One such prior art solution, the Brayton power cycle (gas turbine) is superior based on considerations of power density, simplicity of manufacture, and efficiency.

The Brayton gas turbine consists of a compressor, a combustion chamber, and a turbine driven by the combustion exhaust that powers the compressor. A macro-scale gas turbine with a meter-diameter air intake area generates power on the order of 100 MW. The residual enthalpy in the exhaust stream provides thrust or can power an electric generator. Therefore, a micro-scale gas turbine generator with the same basic architecture would produce tens of watts of power as long as the power per unit air flow is maintained. However, the current Brayton turbines suffer from the disadvantage that they require large venting compressors to make use of environmental air, and do not readily lend themselves to miniaturization, or work in all environments. They are also energy inefficient. Accordingly, a gas turbine generator which overcomes the shortcomings of the prior art is desired.

BRIEF DESCRIPTION OF THE DRAWINGS

FIG. 3 is a sectional view along the length of a compressor-less micro gas turbine power generating system constructed in accordance with the invention;

FIG. 4 is a sectional view taken along lines 4-4 of FIG. 3;

DETAILED DESCRIPTION OF THE PREFERRED EMBODIMENTS

Figure 1:
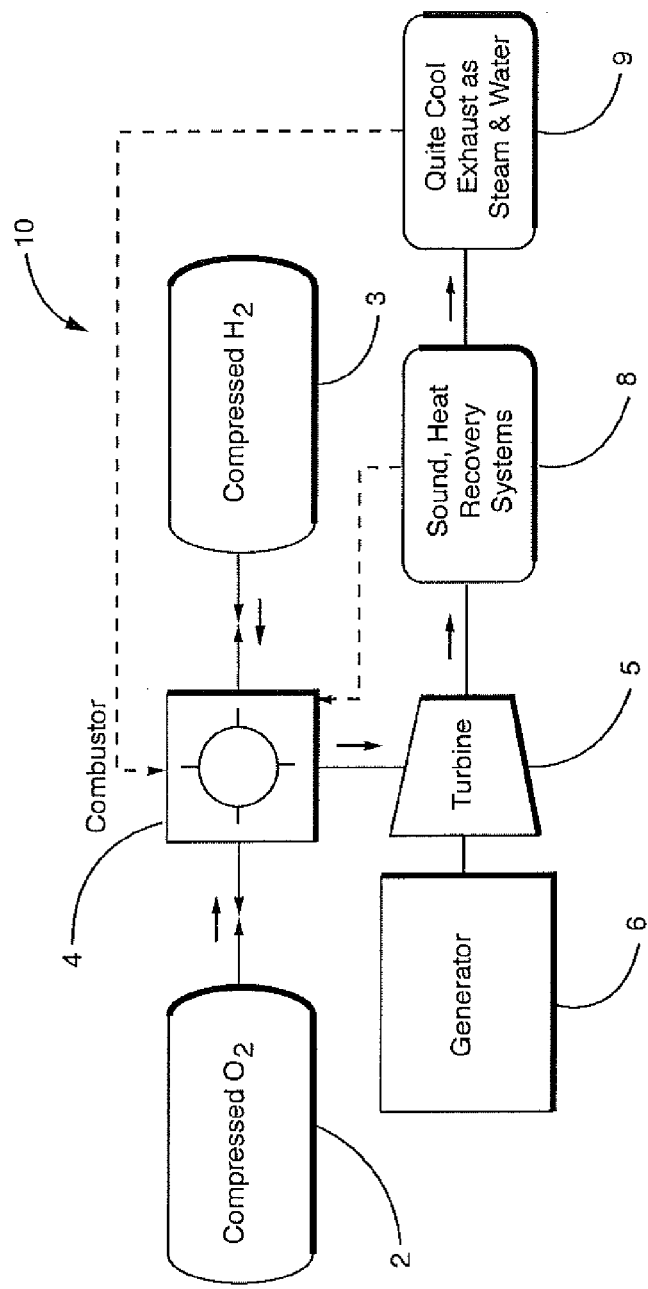
FIG. 1 is a schematic diagram of the compressor-less micro gas turbine power generating system constructed in accordance with the invention.
Figure 2:
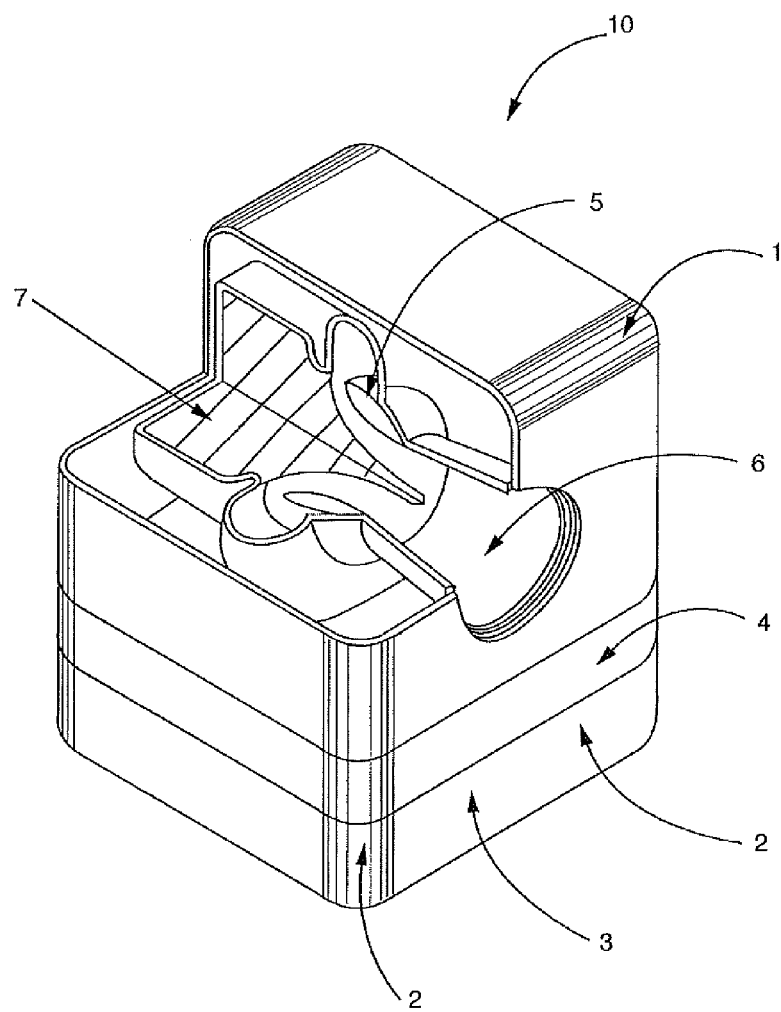
FIG. 2 is a partial sectional view of one embodiment of the compressor-less micro gas turbine power generating system constructed in accordance with the invention.

Reference is now made to FIGS. 1 and 2 in which a schematic and sectional view of a compressor-less micro turbine power generating system ("CMGT") constructed in accordance with a first embodiment of the invention is shown.

A CMGT, generally indicated as 10 includes a casing 1 for supporting the operating elements of CMGT 10 therein. Casing 1 is an active protective barrier between the turbine core and the ambient environment. Casing 1 protects against damage, contamination of the turbine as well as protects the environment from the turbine.

One or more compressed working medium containers 2 are supported by casing 1. In a preferred embodiment, containers 2 are single or multiple replaceable pressurized vessels. These containers required no mechanical components or systems. They can be pressurized to any required pressure and modulated to increase power or efficiency by varying the flow rate from the canister or even the gas mixture itself using a valve, or other flow control mechanisms as known in the art.

A fuel container 3 is also disposed on housing 1. Container 3 may also be a single or multiple replaceable pressurized vessel containing fuel used to heat the working medium, to expand the working medium through turbine 5. In a preferred embodiment, access is easily made to a working medium container 2 and fuel container 3 to allow simple replacement when the containers are expended.

A combustion chamber 4 is in fluid communication with working medium container 2 and fuel container 3 and is disposed within housing 1. Combustion chamber 4 is constructed as either a constant volume or constant pressure system. The fuel is mixed, combusted and distributed to turbine 5 through the combustion chamber 4 in an open loop system in a preferred embodiment. In a closed loop system, heat is added outside the chamber to expand the working medium within the combustion chamber and only the working fluid is distributed to the turbine. A turbine 5 is disposed within housing 1 in fluid communication with combustion chamber 4 and downstream thereof. Turbine 5 may be readily or actually, or a combination thereof oriented relative to the combustion chamber and may be formed as single or multi-stage, shrouded or unshrouded turbine blades. In a preferred embodiment, the blades of turbine 5 are integrated with a rotor for a single piece construction.

A generator 6 is formed of a rotor operationally coupled to the turbine to rotate therewith and a stator to convert the mechanical rotational energy of turbine 5 to electrical energy. An exhaust 7 in fluid communication with turbine 5, downstream of turbine 5 expels gases including the liquids and heat associated therewith from turbine 5 once the mechanical work has been extracted from turbine 5.

In a preferred embodiment, the combustion chamber 4 is vertical in design but is not limited to such geometry. Furthermore, in a preferred embodiment, turbine 5 is a single radial stage turbine.

To promote portability, the materials of CMGT 10, where possible, need to be lightweight, high strength and resistant to the effects of high temperature of the mechanical properties of the material. Turbine 5 is preferably, by way of non-limiting example, formed of polymer ceramic materials to provide low thermal (between 1.5 and 40 W/km; and preferably between 1.5 and 20 W/km) conductivity and resistance to degradation at operating temperatures required of optimal operation. However, the material is not limited to ceramic material by design.

As mentioned above, the prior art gas turbine consists of a compressor, a combustion chamber, and a turbine driven by the combustion exhaust that powers the compressor. The shaft of the compressor turbine can be then coupled to a generator thus allowing for power generation, i.e. production of electricity. However, CMGT 10 of the present invention is unique in the fact that it does not have a compressor. Compressors of gas turbine(s) consume approximately two thirds of the total power output generated by the turbine. Thus CMGT 10 as constructed may therefore be up to two thirds more efficient than a traditional gas turbine engine by operating without a compressor. This is possible because of the size and the design of CMGT 10.

In order to eliminate the compressor and thus the mechanical restraints and efficiency losses of a physical compressor, the system mimics the functionality of a compressor by nature. To do this a new method was developed which uses pre-filtered pre-compressed gasses stored in cylinders and pre-filtered pre-compressed fuel(s) stored in cylinders.

The structure is such as to minimize the number of designed joints and the number of steps needed for manufacturing/assembly thus increasing manufacturing and operation efficiency while reducing cost. CMGT 10 use of the polymer to ceramic material, allows for the utilization of a rapid prototyping process called stereo lithography (SLA) which is an additive manufacturing process. This process makes it possible to print near net shape parts which in turn allows for a CMGT design that utilizes minimal joints and nearly eliminates the entire assembly process simplifying design, manufacture and assembly. However, the manufacturing process is not limited to just only stereolithography (SLA) or any other additive manufacturing process and there are many assembly methods that could be utilized to meet the stated optimal manufacturing/assembly method(s) mentioned herein.

An optional sound/heat recovery system 8 may be disposed within casing 1 downstream of the exhaust 7 of turbine(s). Sound/heat recovery system 8 is a functional heat sink, which recovers excess heat from system as the gas cools and may recirculate that heat to combustion chamber 4 increasing the efficiency of the overall system. Some of the energy from turbine 5 is translated into sound, making the portable device inappropriate in certain environments where stealth or close body proximity are required. Accordingly, baffles or other sound recovery or dampening systems may be incorporated into recovery system 8.

Another optional structure to improve efficiency is a cooling chamber 9 disposed within casing 1. The cooling chamber receives the gas as it is expanded from turbine 5, cools the gas to become steam, or in the case of an oxygen hydrogen mixture of water, and either stores the condensed water to be later used as drinking water or for other water purposes. Additionally, the steam may be recycled as an input as shown by the dotted lines, to combustion chamber 4 in the form of steam or densed gas which augments the overall power of the system.

Compressor-less micro gas turbine 10 has a compressed working medium container 2 for maintaining a gas turbine under pressure. A combustion chamber 4 is in fluid communication with the compressed gas container 2 through a valve 10 for receiving a gas from the gas container and heating the gas within the combustion chamber to create an expanded gas. A heater (not shown) heats the combustion chamber 4 to expand the working gas therein as the expanded gas. A turbine 5 is in fluid communication with the combustion chamber 4 for receiving the expanded gas. The expanded gas drives the turbine 5. A generator 6 is operatively coupled to the turbine 5. The turbine 5 provides a mechanical input to the generator 6 causing the generator 6 to produce electricity.

In the open loop embodiment, the contents of the pre-compressed working medium gas container(s) 2 and of the pre-compressed fuel container(s) 3 are expelled under pressure into the combustion chamber(s) 4 such that a given/desired pressure ratio is achieved. Preferably, readily available gases are used such as Oxygen for the working medium and Hydrogen for the fuel. Upon reaching the given/desired pressure ratio, the mixed combination of gas(es) and fuel(s) is then ignited and expelled out of the combustion chamber(s) 4 at a given velocity, i.e. mass flow rate, due to the expansion of the ignited gas(es) and fuel(s) mixture. The ignited gas(es) and fuel(s) expelled from the combustion chamber(s) 4 now traveling in the form of an expanded gas(es) and comes in contact with the turbine(s) 5 in such a way that work, i.e. mechanical energy, is extracted from the expanded gas. The mechanical energy is transferred from the turbine(s) 5 to the generator(s) 6 thus creating electric energy, i.e. electricity. The expanded gas(es) from the turbine(s) 5 is then expelled from the turbine(s) 5 through the exhaust(s) 7.

In a closed loop system, the combustion chamber is heated without combusting fuel. The chamber itself is heated to a high temperature through a mechanism such as light or atomic radiation so that as compressed gas from working medium container 2 enters the chamber it expands from the heat, without ignition, and passes through turbine 5 to drive turbine 5. In this way, the amount of available working gas, may be increased because there is no longer a need for a fuel container 3. As a result, in the closed loop system with the appropriate heating element, the lifetime of the generator may be increased as a function of the increased available volume of compressed working gas.

As gas exits exhaust 7 it may be released into the environment. However, in a preferred, but non-limiting embodiment, the exhaust gas is passed through into a recovery system 8, which removes some of the residual heat from the expanded gas and recycles the heat to the combustion chamber 4. Additionally, any noise generated by turbine 5 is captured and/or dissipated by the baffles and sound capturing system of recovery system 8. Simultaneously therewith, a cooling chamber 9 receives the gas as it exits exhaust 7 and condenses the gas into steam or liquid. If, as in the preferred embodiment, the fuel is hydrogen and the working gas is oxygen, then water is formed which may be stored for later use by an individual. If the cooling process is stopped at an intermediate stage, wherein the gas is steam, then the steam may be recycled back to the combustion chamber as a denser working medium for power augmentation.

In a preferred embodiment, containers 2, 3 are detachably affixed within 2 housing 1. In this way, they are easily replaced in situ as gas is consumed. Containers 2, 3 may be affixed to combustion chamber 4 by way of valve coupling, screw coupling, projection or any other quick release or detachable means which provides a secure fit and enables gas flow.

The driving of turbine 5 is the function of the gas pressure within the turbine. Additionally, pressure is a function of volume and temperature. Therefore, by selecting various fuels, having different combustion temperatures, given the fixed volume of the turbine 5 or combustion chamber 4, the pressure and the overall energy operative system may be regulated and/or varied. Furthermore, by changing the working gas or fuel to one which has different properties as a function of heat, i.e., different coefficient of thermal expansion, a speed of the turbine may be controlled given a constant temperature and volume by selection of the compressed gas in compressed container 2. Similarly, by choosing the appropriate heating medium in a closed loop system, the temperature of the combustion chamber 4 may be controlled as well to increase the pressure of the working medium given the same volume of combustion chamber 4.

By removing the compressor and its need to capture large volumes of air at an intake, the compressor-less micro gas turbine may be made at very small dimensions. By way of non limiting example, the volume of compressor-less micro generating turbine 10 may be about one cubic inch to three cubit feet. Preferably, the dimensions of casing 1 may be sufficiently small to fit into a pocket or the hand of a user.

Reference is now made to FIGS. 3 and 4 in which a preferred, but non-limiting exemplary embodiment, is provided. A compressor-less micro-gas turbine, generally indicated as 100 has a casing 102. Stationary vanes 104 are disposed within casing 102. Stationary vanes 104 are formed as a cylindrical body 106 with the individual vanes 108 extending therefrom at spaced intervals. A combustion chamber 110 is formed within body 106 of stationary vane 104. An ignitor 112 is disposed in operative communication with combustion chamber 110.

A rotor 114 is rotatably disposed within casing 102 about stationary vane 104. A rotating containment shell 117 is disposed about the rotor blades of rotor 114. A generator rotor 116 is disposed upon rotor containment shell 117 and rotates therewith. In one embodiment, a generator stator 119 is fixedly disposed about generator rotor 116 to be operatively linked with generator rotor 116 so that as generator rotor 116 rotates, electricity is produced as known in the art.

Casing 102 is provided with one or more valves 118 (or gas inlets), which allow gas to enter casing 102. Casing 102 is substantially gas tight other than inlets 118. A gas pathway 120, within casing 100, is formed between gas inlets 118 and combustion chamber 110. Compressed gas passes through pathway 120 to combustion chamber 110. In this way, gas inlets 118 are in fluid communication with combustion chamber 110. Casing 100 is provided with at least one exhaust 124.

Figure 5:
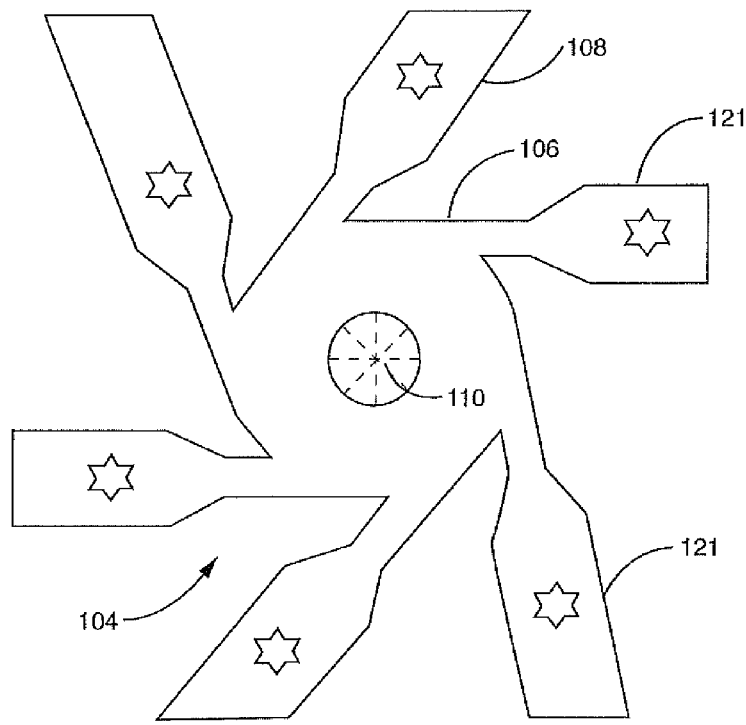
FIG. 5 is a top plan view of a stationary vane constructed in accordance with the invention.

As shown in FIG. 5, stationary vanes 104 include gas flow conduits 121 disposed within vanes 108. In this way, the pathway for gas passing through casing 102 is in through inlets 118 along pathway 120. In a preferred and, but non-limiting example, pathway 120 extends along an inner wall of casing 102 to combustion chamber 110 in the direction of arrow B. As will be discussed below a portion 123 of gas pathway 120 forms a heat exchanger. The gas enters combustion chamber 110 past ignitor 112 in the direction of arrows C to pass through combustion chamber 110. The gas then exits chamber 110 in the directions of arrow D and through gas flow conduits 121 in the direction of arrows E to exhaust 124.

A compressed gas chamber 200 is formed as a cap 200 having a cavity therein. In a preferred embodiment, cap 200 is releasably affixed to casing 102. Cap 200 is formed with valve 202 disposed to communicate with gas inlets 118 when in facing relation therewith. As is known in the art, valve 202 may be ball valves which interact with a bayonet input 118 or any other type of operatively communicating mating structure which allows for the opening of valves 202 when in contact with inlets 118, and the flow of gas from cap 200 to casing 102 through inlets 118. Cap 200 is affixed to casing 100 by snap fit, threaded screw on configuration or the like, such that a holding force is produced between cap 200 and casing 102 greater than any force resulting from the escape of compressed gas from cap 200. It is well understood that cap 200 may be formed as integral gas chamber with casing 102 as discussed above.

Figure 6:
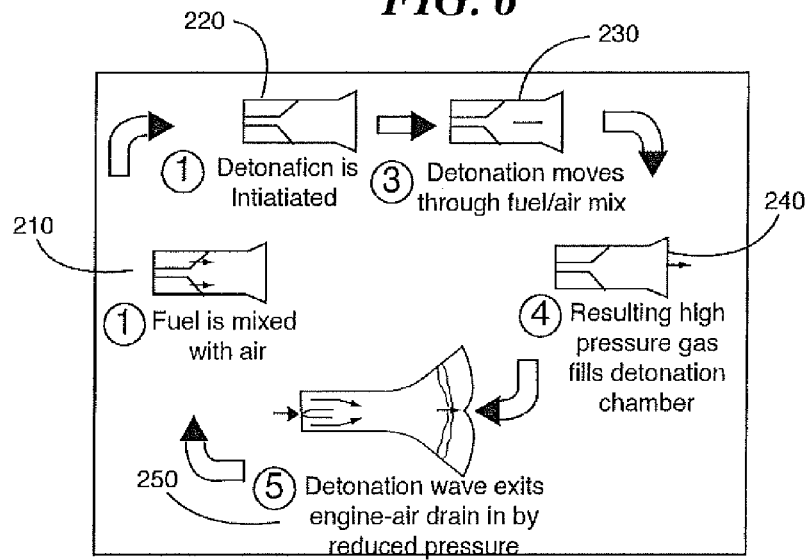
FIG. 6 is an operational flow diagram showing the operation of the PDE wave cycle of the compressor-less micro gas turbine power generating system in operation in accordance with the invention.

Reference is now made to FIG. 6 in which a schematic diagram of the treatment of the fuel is provided. In a preferred, but non-limiting embodiment, Humphrey cycle combustion is used to take advantage of the constant volume and low pressure of fuel and oxidizers. As shown in a step 210 of FIG. 6, fuel is mixed with air oxidizer (either within cap 202 or by combining two separate compartments of gas of cap 200). The gas and the air fuel mixture is detonated by ignitor 112 in a step 220. In a step 230 detonation moves through the fuel/air mix to result, as shown in step 240, in a high pressure gas, filling combustion chamber 110. A pressure wave is created within the gas as it expands.

As the gas expands in the designed, but confined space, it increases in pressure. The wave exits through the point of least resistance which is the reduced pressure existing through stationary vane 104 towards exhaust 124 in a step 250. Once a new fuel/air charge has been drawn into combustion chamber 110, a much smaller amount of a very volatile fuel/oxygen mixture (hydrogen/oxygen in a non-limiting example) are injected into a trigger chamber at the entrance end of combustion chamber 110. To repeat the cycle upon detonation.

Cap 200 contains a compressed oxidizer/fuel source maintained at a relatively high pressure (about 400 bar by way of non-limiting example) and at ambient temperature (about 15 degrees centigrade). The combination of a relatively high pressure and substantially low temperature allows maximum volume of oxidizer/fuel during storage for longer operating durations. During operation, cap 200 is placed upon casing 102 in the direction of arrow F. The cap 200 is placed on with sufficient force so as to bring valve 202 in fluid communication with gas inlets 118. This causes gas (either fuel, air or a fuel/air mixture) to pass into casing 102 through gas pathway 120 and into combustion chamber 110.

As can be seen, gas pathway 120 transports the compressed oxidizer/fuel between the hot running rotor 114 and casing 102. In a preferred embodiment an insulation 115 may be provided within casing 102 for reducing loss of heat and thermal signature. Insulation 115 may be made of an aero gel or other non-thermally conducting material. In this manner, the gas passing through passage 120 acts to cool the outer surfaces of casing 102 while increasing the temperature of the oxidizer/fuel mixture, particularly, in heat exchanger portions 123 just prior to combustion. Additionally, the relatively cool gas mixture reduces the thermal signature of the overall unit.

The preheated fuel/oxidizer mixture is injected into combustion chamber 110. Ignitor 112 combusts the compressed gas causing the gas to expand and move out through stationary vanes 108 of the expansion turbine. The resulting force from the expanded gas exiting vane 108 rotates ceramic rotor 114 about stationary vane 104 providing either electrical or mechanical energy (when a shaft is affixed to the rotor).

As gas is combusted and move through rotor 114, it exits exhaust 124, where it may be cool; exiting as steam or even as cold as water. As the gas exits in the direction of arrow F it interacts with heat exchanger portion 123 of gas pathway 120 to transfer the heat from the exhaust stream to the relatively cooler oxidizer/fuel traveling through gas pathway 120. This increases the oxidizer/fuel temperature to optimize the combustion process by reducing the required temperature rise requirements. Additionally, it has the effect of cooling the exhaust gas so that the gas exhaust is low (near ambient) temperature and at a low (near atmospheric) pressure.

In a preferred embodiment, rotor 114 is made of a ceramic material. Ceramic thrives on compression so as it rotates, there is little wear and tear on rotor 114. Because blades 108 of stationary vane 104 do not move, wear and tear on blades 108 is also minimized. Furthermore, because ceramic is not a good thermal conductor as compared to metal, the heat is better retained in combustion chamber 110 and the exterior of casing 102 is maintained cooler. The gas passing through the gas passageway 120 is also a relatively cool gas compared to the combusted gas and because it moves along the exterior, provides further cooling. Lastly, aero gel insulation 115 may be provided within casing 102 as a final insulator.

The above construction provides efficient use and storage of fuel and oxidizer at low temperatures and higher pressures for enhanced operational duration. The novel structure for utilizing the gas itself as an insulator and preheating mechanism of the fuel/oxidizer mixture provides combustion efficiencies requiring a lower amount of chemical heating or of the working medium and improved heat signature including reduction in the exhaust heat. Also, by utilizing the structure with high pressure gas, the high pressure working medium may be used for bearing surfaces before being directed to the turbine inlets resulting in reduced wasted pressure and potential work.

By providing a compressor-less system there is a reduction in gas turbine system weight, efficiency gains, increases of up to two thirds, and the ability of variable compression ratios and fuel mixtures. The present CMGT may run under water and in space, i.e. a vacuum. This is possible due to the CMGT not being dependent on atmospheric air which is required by traditional gas turbine engine(s) in order for them to operate. Additionally, there is no need for a compressor air intake filtration system due to the CMGT being compressor-less with pre-filtered and pre-compressed gases, i.e. air. The fuel and working gas portions of the system are self-contained. Thus, additional weight reduction is possible and the event of foreign object damage (FOD) associated to partials/debris, injected into the engine through the air intake filtration system, is eliminated. One other advantage of the CMGT is its power output flexibility which allows the operator to change output power on demand by controlling valves, gas types and/or fuels as discussed above. This means, unlike batteries and fuel cells, the operator can decide how much power he/she needs based on "what it is" that they are in need of operating.

It should also be noted that although the structure was described in terms of a compressor-less turbine generator, many of the innovative structures may be applied to turbines having compressors. Accordingly, the claims and scope of the invention should not be so limited.

Thus, while there have been shown, described and pointed out novel feature of the present invention as applied to preferred embodiments thereof, it will be understood that various omissions and substitution in changing the form and details of the disclosed invention may be made by those skilled in the art without departing from the spirit and scope of the invention. It is the intention, therefore, to be limited only as indicated by the scope of the claims appended hereto. It is also to be understood that the following claims are intended to cover all of the generic and specific features of the invention herein described and all statements of the scope of the invention, which is a matter of language, might be said to fall there between.

What is claimed as new and desired to be protected by Letters Patent of the United States is:

1. A compressor-less micro gas turbine comprising:
    a compressed working medium container for maintaining a gas therein under pressure;
    a combustion chamber in fluid communication with the compressed gas container for receiving a gas from the gas container and heating the gas within the combustion chamber to create an expanded gas;
    a heater for heating the combustion chamber;
    a turbine in fluid communication with the combustion chamber for receiving the expanded gas; the heated gas driving the turbine; and
    a generator operatively coupled to the turbine, the turbine providing a mechanical input to the generator and causing the generator to produce electricity; and a casing, the combustion chamber, the heater, the turbine and the generator being disposed within said casing; and a stationary vane disposed within said casing, the combustion chamber being disposed within said stationary vane; the turbine being a rotor rotatably mounted about said stationary vane, and the generator being operatively coupled to the rotor.

2. The compressor-less micro gas turbine of claim 1, wherein said heater means is a radiation source.

3. The compressor-less micro gas turbine power generating system of claim 1, further comprising a fuel container, containing a fuel therein, and in fluid communication with the combustion chamber, the heater including an igniter for igniting said fuel within said combustion chamber to heat the combustion chamber.

4. The compressor-less micro gas turbine of claim 1, further comprising an exhaust downstream of said turbine for exhausting the expanded gas as it passes through the turbine; and a recovery system for recovering heat from said expanded gas as it passes from the exhaust and recycling said heat to said combustion chamber.

5. The compressor-less micro gas turbine of claim 1, further comprising a cooling mechanism, operatively coupled to said exhaust for cooling said heated gas as it exits the exhaust.

6. The compressor-less micro gas turbine of claim 1, further comprising said compressed working medium container being detachably affixed to said casing; compressed gas being provided to said casing when said compressed working medium container is affixed to said casing.

7. The compressor-less micro gas turbine of claim 6, wherein said rotor is a ceramic rotor.

8. The compressor-less micro gas turbine of claim 1, further comprising the combustion chamber, heater turbine and generator being disposed within said casing; and
    a pathway for transporting a gas between said compressed working medium container and said combustion chamber disposed between said casing and at least one of said combustion chamber, heater, and turbine.

9. The compressor-less micro gas turbine of claim 6, further comprising at least one gas flow conduit disposed within said stationary vane.

10. The compressor-less micro gas turbine of claim 1, wherein said rotor is formed from a ceramic material.

11. The compressor-less micro gas turbine of claim 6, wherein said rotor includes rotor blades, the stationary vane includes vanes; at least one said vane being disposed adjacent at least one said rotor blade.

12. The compressor-less micro gas turbine of claim 6, wherein said compressed working medium container is formed as a cap selectively affixed to said casing.

13. The compressor-less micro gas turbine of claim 6, further comprising a valve, the valve providing fluid communication between said compressed working medium container and said casing when a cap is affixed to said casing.

14. The compressor-less micro gas turbine of claim 8, further comprising an exhaust downstream of the turbine for exhausting spent fluids which have passed through the turbine, and the pathway being disposed between at least a portion of the exhaust and the casing.

15. The compressor-less micro gas turbine of claim 1, wherein said turbine includes the stationary vane and rotor.

* * * * *